United States Patent
Bloms et al.

(10) Patent No.: US 6,837,212 B2
(45) Date of Patent: Jan. 4, 2005

(54) FUEL ALLOCATION AT IDLE OR LIGHT ENGINE LOAD

(75) Inventors: Jason K. Bloms, Peoria, IL (US); Brian G. McGee, Chillicothe, IL (US); David Andrew Pierpont, Dunlap, IL (US); Jeffrey A. L. Smith, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 57 days.

(21) Appl. No.: 10/324,291

(22) Filed: Dec. 19, 2002

(65) Prior Publication Data

US 2004/0118377 A1 Jun. 24, 2004

(51) Int. Cl.$^7$ ................................................ F02B 3/00
(52) U.S. Cl. ..................................... 123/299; 123/300
(58) Field of Search ............................. 123/299, 300, 123/305, 339.29, 357, 577

(56) References Cited

U.S. PATENT DOCUMENTS

| | | | |
|---|---|---|---|
| 4,140,088 A | * | 2/1979 | de Vulpillieres ............ 123/478 |
| 4,383,515 A | * | 5/1983 | Higashiyama et al. ...... 123/692 |
| 4,528,960 A | * | 7/1985 | Mizuno et al. ............. 122/478 |
| 6,125,823 A | | 10/2000 | Thomas |
| 6,305,348 B1 | | 10/2001 | Grosmougin et al. |
| 6,314,945 B1 | | 11/2001 | Sugiyama et al. |
| 6,330,796 B1 | | 12/2001 | Nishimura et al. |
| 6,332,447 B1 | | 12/2001 | Kimura et al. |
| 6,390,058 B1 | | 5/2002 | Takashi et al. |
| 6,659,068 B2 | * | 12/2003 | Urushihara et al. ......... 123/295 |

* cited by examiner

Primary Examiner—Mahmoud Gimie
(74) Attorney, Agent, or Firm—Michael B McNeil

(57) ABSTRACT

Apparatuses and methods for delivering fuel to at least two combustion chambers of an engine. A fuel controller receives a first fuel quantity signal indicative of a first desired quantity of fuel to be delivered to each combustion chamber of the engine during a combustion cycle. The fuel controller transmits at least one second fuel quantity signal as a function of the first fuel quantity signal, and transmits at least one third fuel quantity signal as a function of the first fuel quantity signal. The second and third fuel quantity signals are indicative of a respective second and third desired quantities of fuel to be delivered during a combustion cycle. The sum of the fuel quantities corresponding to the second fuel quantity signals transmitted during a combustion cycle are less than the first desired fuel quantity.

17 Claims, 1 Drawing Sheet

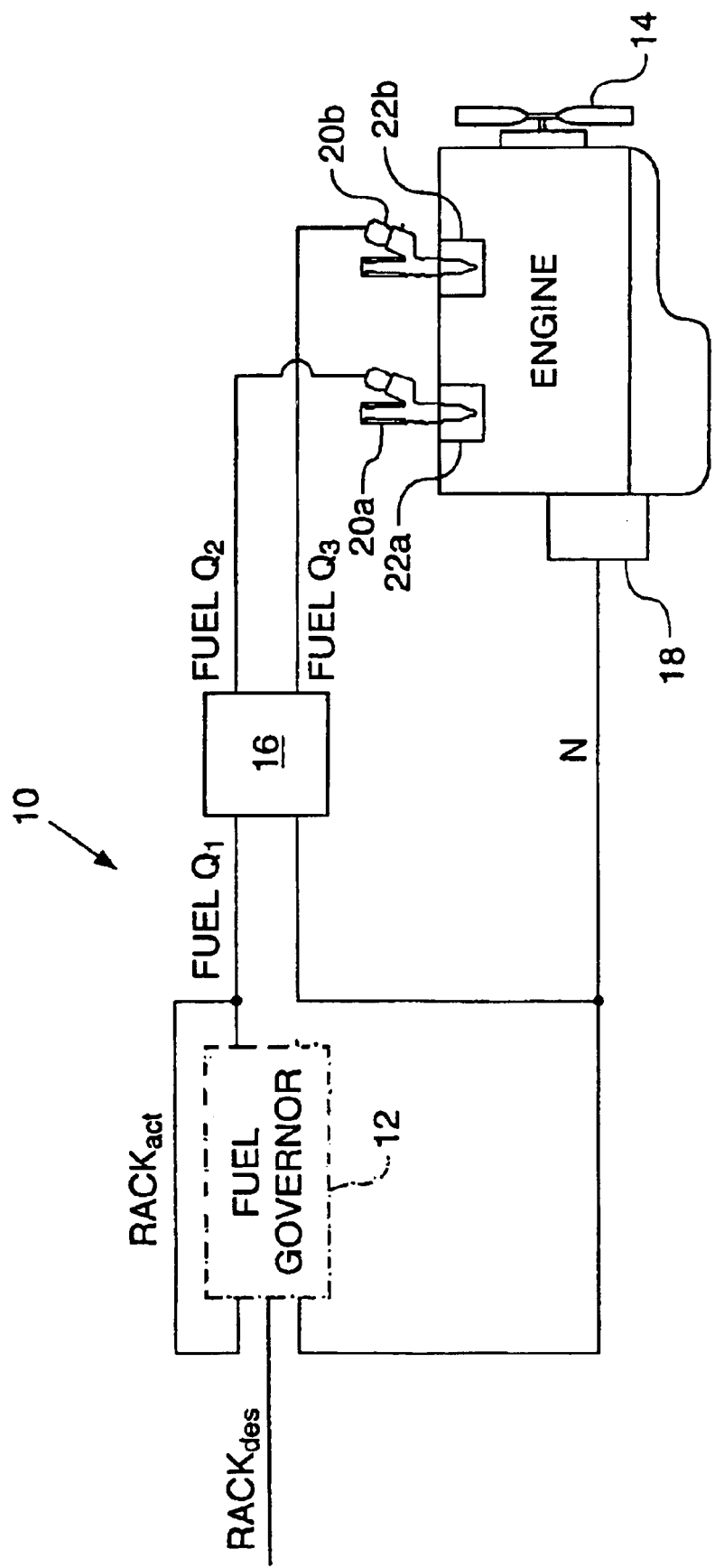

FUEL ALLOCATION AT IDLE OR LIGHT ENGINE LOAD

TECHNICAL FIELD

This invention relates generally to the delivery of fuel to an engine, and more specifically, to controlling fuel delivery during idle or light engine loads.

BACKGROUND

Controlling the fuel delivery to an engine is a recognized technique to affect the traditional operating characteristics of the engine, such as engine speed and torque. More recently, it is one of several ways used to reduce the emissions, such as $NO_x$ and particulates from the engine.

When the engine is operating at idle speeds, or light or no load conditions, conventionally a relatively small amount of fuel is delivered, e.g., injected, into each combustion chamber of the engine by a fuel delivery device, such as a fuel injector.

As a practical matter, however, each fuel injector has a minimum controllable amount of fuel that it injects each time it is activated. This is typically due to inherent constraints and tolerances in the design and manufacture of fuel injectors. Thus, if a desired amount of fuel to be injected is less than the minimum controllable fuel injection quantity, either no fuel may be injected, or the minimum quantity may be injected, or some quantity in-between. In any case, a quantity of fuel that is different from what is desired may be delivered to the combustion chamber of the engine. This can lead to undesired emissions or engine performance.

With the advent of multi-shot injections, e.g., more than 1 shot of fuel per cylinder per combustion cycle (intake, compression, power, and exhaust for a four stroke engine) the quantity of fuel delivered per combustion cycle is divided into two or more injections. Thus, the quantity of fuel per injection is smaller, and the fuel injector is more likely to run into the problem described above.

SUMMARY OF THE INVENTION

The present invention provides apparatuses and methods for delivering fuel to at least two combustion chambers of an engine. A fuel controller receives a first fuel quantity signal indicative of a first desired quantity of fuel to be delivered to each combustion chamber of the engine during a combustion cycle. The fuel controller transmits at least one second fuel quantity signal as a function of the first fuel quantity signal, and transmits at least one third fuel quantity signal as a function of the first fuel quantity signal. The second and third fuel quantity signals are indicative of a respective second and third desired quantities of fuel to be delivered during a combustion cycle. The sum of the fuel quantities corresponding to the second fuel quantity signals transmitted during a combustion cycle are less than the first desired fuel quantity.

BRIEF DESCRIPTION OF THE DRAWINGS

FIG. 1 is a functional block diagram of an apparatus according to one embodiment of the invention.

DETAILED DESCRIPTION

FIG. 1 is a functional block diagram of an apparatus 10 according to one embodiment of the invention.

The apparatus 10 may include a fuel governor 12 that may receive an operating characteristic signal indicative of a desired operating characteristic of the engine, such as a desired fuel quantity to be delivered to each combustion chamber, e.g. cylinder, of an engine 14. For example, the operating characteristic signal may be a desired rack ("$RACK_{des}$"), desired engine speed, or desired torque taken from, for example, the position of an accelerator pedal or throttle (not shown). The fuel governor 12 may also receive a variety of other signals known to those skilled in the art, such as, for example, an actual engine speed signal ("N"), and an actual rack signal ("$RACK_{act}$").

The fuel governor 12 may process the signals that it receives by ways known to those skilled in the art to produce a first fuel quantity signal ("$FUELQ_1$") indicative of a desired fuel quantity to be delivered to each combustion chamber of the engine 14.

Although described herein as a fuel quantity signal for purposes of illustration, the first (and other) fuel quantity signals may be any of a variety of appropriate signals indicative of fuel flow. For example, it may be a fuel flow quantity, a fuel flow duration, a position of a fuel valve, a change in position of a fuel valve, or a rate of change of a position of a fuel valve. Similarly, it may be an air flow quantity, an air flow duration, a position of an air valve (including a bypass or wastegate), a change in position of an air valve, or a rate of change of a position of an air valve.

The first fuel quantity signal $FUELQ_1$ may be fed back to the fuel governor 12 as the actual rack signal $RACK_{act}$ as shown in FIG. 1. In other embodiments of the invention, the actual signal $RACK_{act}$ may be determined by other ways known to those skilled in the art.

A fuel controller 16 may be coupled with the fuel governor 12 to receive the first fuel quantity signal $FUELQ_1$. The fuel controller 16 may transmit a second fuel quantity signal ("$FUELQ_2$") and a third fuel quantity signal ("$FUELQ_3$") as a function of the first fuel quantity signal $FUELQ_1$. The second and third fuel quantity signals $FUELQ_2$, $FUELQ_3$ may be indicative of a respective second and third desired quantities of fuel. The fuel controller 16 generally controls the timing, duration, etc. of the fuel delivery with the second and third fuel quantity signals $FUELQ_2$, $FUELQ_3$ by ways known to those skilled in the art.

In one embodiment of the invention, the second fuel quantity signal $FUELQ_2$ may be indicative of a fuel quantity that is less than the fuel quantity indicated by the first fuel quantity signal $FUELQ_1$, and the third fuel quantity signal $FUELQ_3$ may be indicative of a fuel quantity that is equal to the fuel quantity indicated by the first fuel quantity signal $FUELQ_1$.

In another embodiment of the invention, the second fuel quantity signal $FUELQ_2$ may be indicative of a fuel quantity that is less than the fuel quantity indicated by the first fuel quantity signal $FUELQ_1$, and the third fuel quantity signal $FUELQ_3$ may be indicative of a fuel quantity that is greater than the fuel quantity indicated by the first fuel quantity signal $FUELQ_1$.

In some embodiments of the invention, the fuel controller 16 may also receive the actual engine speed signal N. The actual engine speed signal may be received from any of a variety of sources known to those skilled in the art, such as, for example, an engine speed sensor 18 that detects the movement of a flywheel (not shown) on the engine 14.

The fuel controller 16 may then use the actual engine speed signal N, either alone or in combination with the first fuel quantity signal $FUELQ_1$ as enabling logic to transmit the second and third fuel quantity signals $FUELQ_2$, FUELQ$_3$. For example, the fuel controller may only transmit the second and third fuel quantity signals FUELQ$_2$, FUELQ$_3$ when the engine 16 is operating at idle, or in a light or no-load condition.

Idle may be determined, for example, by engine speed signal N alone, while the light or no-load conditions may be determined using both the actual engine speed signal N and the actual rack signal RACK$_{act}$ by ways known to those skilled in the art. The particular boundaries that define "idle", "light load", and "no load" conditions for the engine may vary from engine to engine, and may be defined as appropriate by ways known to those skilled in the art. for example, in one embodiment of the invention, using a Caterpillar C-12 engine, idle is defined as approximately 11–15 mm$^3$ of fuel, no load is defined as 11–15 mm$^3$ of fuel above 600 rpm, and light load is defined as 15–20 mm$^3$ of fuel at any engine speed.

Idle may be determined, for example, by engine speed signal N alone, while the light or no-load conditions may be determined using both the actual engine speed signal N and the actual rack signal RACK$_{act}$ by ways known to those skilled in the art. The particular boundaries that define "idle", "light load", and "no load" conditions for the engine may vary from engine to engine, and may be defined as appropriate by ways known to those skilled in the art. for example, in one embodiment of the invention, using a Caterpillar C-12 engine, idle is defined as approximately 11–15 mm$^3$ of fuel, no load is defined as 11–15 mm$^3$ of fuel above 600 rpm, and light load is defined as 15–20 mm$^3$ of fuel at any engine speed.

In other embodiments of the invention, other logic known to those skilled in the art may be used to enable or disable the transmission of the second and third fuel quantity signals FUELQ$_2$, FUELQ$_3$.

When the fuel controller 16 is disabled from transmitting the second and third fuel quantity signals FUELQ$_2$, FUELQ$_3$ due to the situation described above, the fuel controller 16 may transmit the first fuel quantity signal FUELQ$_1$ or its equivalent on the transmission lines that normally carry the second and third fuel quantity signals FUELQ$_2$, FUELQ$_3$.

Fuel delivery devices, such as fuel injectors 20, may respectively receive the second and third fuel quantity signals FUELQ$_2$, FUELQ$_3$. The fuel injectors 20 deliver a quantity of fuel that corresponds to the received fuel quantity signal to a respective combustion chamber 22 by ways known to those skilled in the art. Other fuel delivery devices known to those skilled in the art, such as a carburetor, for example, may be used in other embodiments of the invention.

INDUSTRIAL APPLICABILITY

In operation, the fuel controller 16 may use the first fuel quantity signal FUELQ$_1$ to allocate the fuel to the fuel injectors 20. In one embodiment of the invention, the fuel controller 16 may reduce the fuel requested by the fuel governor 12 to one or more fuel injectors 20. In other words, even though the fuel governor 12 is requesting 2 ml of fuel, for example, be delivered to each combustion chamber, the fuel controller 16 may cause one or more of the fuel injectors 20 to deliver 1 ml of fuel to one combustion chamber, with the remaining fuel injectors delivering the requested 2 ml of fuel. Other magnitudes of fuel reduction may also be used as appropriate.

This technique will typically cause the engine speed to begin to fall, and the fuel governor 16 to request a larger amount of fuel than the original quantity (2 ml in this example) until the desired engine speed/torque is achieved. Thus, the quantities of fuel for the fuel shots that were not reduced is ultimately increased. These larger quantities of fuel are inherently more controllable/easier to manage.

For example, at idle and/or light load conditions, where conventional fuel controllers normally use two shots per cylinder per combustion cycle, the fuel controller 16 according to one embodiment of the invention may cut out one shot, such as the second shot on some percentage of the cylinders, such as half. Thus, half of the cylinders would receive two shots, and half would receive one shot. The effect is that the fuel governor 12 would ask for more fuel, which increases the fuel quantities to the injections that are occurring (the injections that were not cut out). One effect of this is that the injections that are occurring are more controllable because larger quantities of fuel are more manageable than smaller quantities.

In other embodiments of the invention, the fuel controller 16 alone may achieve the same allocation of fuel mentioned above by reallocating the fuel quantities, without the assistance of the fuel governor 20.

In another embodiment of the invention, the fuel controller 16 may reallocate the fuel requested by the fuel governor 12 between two or more fuel injectors 20. In other words, even though the fuel governor is requesting 2 ml of fuel, for example, be delivered to each combustion chamber, the fuel controller may cause the fuel injectors 20 to deliver 1 ml of fuel to one combustion chamber and 3 ml of fuel to another.

In multi-shot operation, the fuel controller 14 may reduce/add fuel to one or both shots, including the elimination or addition of a shot. The elimination of a shot may be beneficial when the quantity of fuel to be injected by a fuel injector approaches (or is even less than) the minimum controllable quantity of injection. The fuel that would have otherwise been delivered by the now eliminated shot can then be allocated to another shot, increasing the quantity of the other shot, and perhaps increasing the volume of this shot above the minimum controllable quantity of injection.

In some embodiments of the invention, the reallocation of fuel need not be performed evenly. For example, the quantity of fuel may be reduced for two of the fuel injectors, and fuel may be added to only 1 fuel injector, or vice versa. Other appropriate combinations of reductions/additions may also be used.

The number of fuel injectors 20 that use this reduction or reallocation technique may be selected as appropriate depending on the desired engine operating characteristics, including emissions. All, some, or none of the fuel injectors 20 may have fuel added or subtracted to their respective fuel quantity signal (e.g., FUELQ$_2$, FUELQ$_3$).

In some embodiments of the invention, the timing for the fuel injections using the above techniques may be varied as compared to fuel delivery methods not using the above technique. For example, in multi-shot injections, it may be beneficial when normally injecting fuel at approximately 45 degrees and 5 degrees before top dead center ("BTDC") to now inject fuel at approximately 30–20 degrees BTDC and at 0–10 degrees after top dead center ("ATDC"). Other timing changes may be appropriate for single shot injections using embodiments of this invention.

The above invention may be used in some applications to affect emissions. Embodiments of the invention have been demonstrated to give a NO$_x$ reduction of approximately 0.2 grams when used during idling for a Caterpillar C-12 engine.

From the foregoing it will be appreciated that, although specific embodiments of the invention have been described herein for purposes of illustration, various modifications may be made without deviating from the spirit or scope of the invention. Accordingly, the invention is not limited except as by the appended claims.

What is claimed is:

1. An apparatus for delivering fuel to at least two combustion chamber of an engine, comprising:
 a fuel controller operable to receive a first fuel quantity signal indicative of a first desired quantity of fuel to be delivered to each combustion chamber of the engine during a combustion cycle, the fuel controller operable to transmit at least one second fuel quantity signal as a function of the first fuel quantity signal and to transmit at least one third fuel quantity signal as a function of the first fuel quantity signal, the second and third fuel quantity signals being indicative of a respective second and third desired quantities of fuel to be delivered to respective combustion chambers during a combustion cycle;
 the sum of the fuel quantities corresponding to the second fuel quantity signals transmitted during a combustion cycle for one combustion chamber being less than the first desired fuel quantity.

2. The apparatus of claim 1 wherein the sum of the fuel quantities corresponding to the third fuel quantity signals transmitted during a combustion cycle for an other combustion chamber is substantially equal to the first desired fuel quantity.

3. The apparatus of claim 1 where the sum of the fuel quantities corresponding to the third desired fuel quantity signals transmitted during a combustion cycle for an other combustion chamber is greater than the first desired fuel quantity.

4. The apparatus of claim 3 wherein the sum of the fuel quantities corresponding to the second and third fuel quantity signals transmitted during a combustion cycle to a respective pair of combustion chambers is substantially equal to twice the first desired quantity of fuel.

5. The apparatus of claim 1, further comprising:
 at least one fuel delivery device coupled with the fuel controller to receive the second and third fuel quantity signals, the at least one fuel delivery device operable
 to substantially deliver the second quantity of fuel to a first combustion chamber of the engine as a function of the second fuel quantity signal and
 to substantially deliver the third quantity of fuel, which is different than the second quantity of fuel, to a second combustion chamber of the engine as a function of the third fuel quantity signal.

6. An apparatus for delivering fuel to at least two combustion chamber of an engine, comprising:
 a fuel controller operable to receive a first fuel quantity signal indicative of a first desired quantity of fuel to be delivered to each combustion chamber of the engine during a combustion cycle, the fuel controller operable to transmit at least one second fuel quantity signal as a function of the first fuel quantity signal and to transmit at least one third fuel quantity signal as a function of the first fuel quantity signal, the second and third fuel quantity signals being indicative of a respective second and third desired quantities of fuel to be delivered during a combustion cycle;
 the sum of the fuel quantities corresponding to the second fuel quantity signals transmitted during a combustion cycle being less than the first desired fuel quantity; and
 a fuel governor operable to receive at least one operating characteristic signal indicative of an operating characteristic of the engine, the fuel governor operable to determine a first characteristic as a function of the at least one operating characteristic signal, the first characteristic being indicative of a first desired quantity of fuel to be delivered to each combustion chamber of the engine when the engine has a predetermined operating characteristic, the fuel governor operable to transmit the first fuel quantity signal indicative of the first characteristic.

7. The apparatus of claim 6 wherein the operating characteristic of the engine comprises a desired operating condition of the engine.

8. The apparatus of claim 7 wherein the operating characteristic of the engine comprises a desired fuel quantity.

9. The apparatus of claim 6 wherein the fuel governor is further operable to receive an engine speed signal indicative of an engine speed of the engine, and the first fuel quantity signal is further a function of the engine speed signal.

10. The apparatus of claim 6 wherein the first fuel quantity signal is further a function of the previous first fuel quantity signal.

11. An apparatus for delivering fuel to at least two combustion chamber of an engine, comprising:
 a fuel controller operable to receive a first fuel quantity signal indicative of a first desired quantity of fuel to be delivered to each combustion chamber of the engine during a combustion cycle, the fuel controller operable to transmit at least one second fuel quantity signal as a function of the first fuel quantity signal and to transmit at least one third fuel quantity signal as a function of the first fuel quantity signal, the second and third fuel quantity signals being indicative of a respective second and third desired quantities of fuel to be delivered during a combustion cycle;
 the sum of the fuel quantities corresponding to the second fuel quantity signals transmitted during a combustion cycle being less than the first desired fuel quantity;
 the fuel controller is further operable to receive an engine speed signal indicative of an engine speed of the engine;
 the sum of the second desired fuel quantity signals per combustion cycle being less than the first desired fuel quantity when the engine speed signal has a predetermined relationship with a predetermined threshold;
 the sum of the second desired fuel quantity signals per combustion cycle being substantially equal to the first desired fuel quantity when the engine speed signal does not have the predetermined relationship with the predetermined threshold;
 the sum of the third desired fuel quantity signals per combustion cycle being greater than the first desired fuel quantity when the engine speed signal has the predetermined relationship with the predetermined threshold; and
 the sum of the third desired fuel quantity signals per combustion cycle being substantially equal to the first desired fuel quantity when the engine speed signal does not have the predetermined relationship with the predetermined threshold.

12. An apparatus for delivering fuel to at least two combustion chamber of an engine, comprising:
 a fuel controller operable to receive a first fuel quantity signal indicative of a first desired quantity of fuel to be delivered to each combustion chamber of the engine during a combustion cycle, the fuel controller operable to transmit at least one second fuel quantity signal as a function of the first fuel quantity signal and to transmit at least one third fuel quantity signal as a function of the first fuel quantity signal, the second and third fuel quantity signals being indicative of a respective second and third desired quantities of fuel to be delivered during a combustion cycle;

the sum of the fuel quantities corresponding to the second fuel quantity signals transmitted during a combustion cycle being less than the first desired fuel quantity;

the fuel controller is further operable to receive an engine speed signal indicative of an engine speed of the engine;

the sum of the second desired fuel quantity signals per combustion cycle being less than the first desired fuel quantity when the engine speed signal indicates that the engine speed is substantially at or below an idle speed of the engine;

the sum of the second desired fuel quantity signal signals per combustion cycle being substantially equal to the first desired fuel quantity when the engine speed signal indicates that the engine speed is not substantially at or below the idle speed of the engine;

the sum of the third desired fuel quantity signals per combustion cycle being greater than the first desired fuel quantity when the engine speed indicates that the engine speed is substantially at or below an idle speed of the engine; and the sum of the third desired fuel quantity signals per combustion cycle being substantially equal to the first desired fuel quantity when the engine speed signal indicates that the engine speed is not substantially at or below the idle speed of the engine.

13. A method for delivering fuel to at least two combustion chambers of an engine, comprising:

determining a characteristic indicative of a fuel quantity to be delivered to each of at least two of the combustion chambers during a predetermined period of time; and delivering a quantity of fuel corresponding to a quantity less than the fuel quantity corresponding to the characteristic indicative of the fuel quantity to at least one combustion chamber during the predetermined period of time.

delivering a quantity of fuel corresponding to a quantity substantially equal to or greater than the fuel quantity corresponding to the characteristic indicative of the fuel quantity to at least one other combustion chamber during the predetermined period of time.

14. A method for delivering fuel to at least two combustion chambers of an engine, comprising:

determining a characteristic indicative of a fuel quantity to be delivered to at least two of the combustion chambers during a predetermined period of time;

inequitably delivering a quantity of fuel corresponding to the characteristic indicative of the fuel quantity to the at least two combustion chambers during the predetermined period of time, wherein one of the two combustion chambers being delivered a lesser quantity of fuel, and an other of the two combustion chambers being delivered a greater quantity of fuel, and the greater quantity of fuel being a more controllable quantity of fuel than the lesser quantity of fuel.

15. The method of claim 14 wherein the characteristic comprises at least one of a fuel quantity, a duration of fuel delivery, a position of a fuel valve, a change in position of a fuel valve, a rate of change of a fuel valve, an air quantity, a duration of air deliver, a position of an air valve, a change in position of a fuel valve, and a rate of change of a position of an air valve.

16. The method of claim 14 wherein determining a characteristic indicative of a fuel quantity to be delivered to at least two of the combustion chambers comprises determining a characteristic indicative of a fuel quantity to be delivered to the combustion chambers when the engine is operating at a first set of predetermined operating characteristics; and wherein inequitably delivering an quantity of fuel corresponding to the characteristic indicative of the fuel quantity to the at least two combustion chambers comprises inequitably delivering a quantity of fuel to a predetermined number of combustion chambers, the quantity of fuel corresponding to the characteristic indicative of the fuel quantity multiplied by the predetermined number of combustion chambers.

17. A method for delivering fuel to an engine having at least n combustion chambers, comprising:

determining a first characteristic indicative of a first quantity of fuel to be delivered to each of the combustion chambers of the engine during a predetermined period of time when the engine has a first set of operating characteristics;

delivering a second quantity of fuel to at least one of the combustion chambers during the predetermined period of time when the engine has the first set of operating characteristics;

delivering a third quantity of fuel to at least one other of the combustion chambers during the predetermined period of time when the engine has the first set of operating characteristics; and wherein the sum of the second and third quantities of fuel, multiplied by the number of combustion chambers receiving the second and third quantities of fuel, corresponds substantially to the first quantity of fuel multiplied by the number of combustion chambers receiving the second and third quantities of fuel, and the second quantity of fuel is not equal to the third quantity of fuel.

* * * * *